(12) United States Patent
Benson et al.

(10) Patent No.: US 10,965,474 B1
(45) Date of Patent: Mar. 30, 2021

(54) MODIFYING SECURITY STATE WITH HIGHLY SECURED DEVICES

(71) Applicant: Apple Inc., Cupertino, CA (US)

(72) Inventors: Wade Benson, San Jose, CA (US); Arthur Mesh, South San Francisco, CA (US)

(73) Assignee: Apple Inc., Cupertino, CA (US)

(*) Notice: Subject to any disclaimer, the term of this patent is extended or adjusted under 35 U.S.C. 154(b) by 161 days.

(21) Appl. No.: 15/953,326

(22) Filed: Apr. 13, 2018

Related U.S. Application Data

(63) Continuation of application No. 15/892,287, filed on Feb. 8, 2018, now abandoned.

(60) Provisional application No. 62/464,313, filed on Feb. 27, 2017.

(51) Int. Cl.
H04L 9/32 (2006.01)
H04L 9/08 (2006.01)
H04L 9/30 (2006.01)

(52) U.S. Cl.
CPC ............ H04L 9/3271 (2013.01); H04L 9/088 (2013.01); H04L 9/0841 (2013.01); H04L 9/0894 (2013.01); H04L 9/30 (2013.01)

(58) Field of Classification Search
CPC ..... H04L 9/3271; H04L 9/0841; H04L 9/088; H04L 9/0894; H04L 9/30
See application file for complete search history.

(56) References Cited

U.S. PATENT DOCUMENTS 5,144,667 A 9/1992 Pogue, Jr.
5,666,415 A * 9/1997 Kaufman .............. H04L 9/3226
380/28

(Continued)

FOREIGN PATENT DOCUMENTS

EP 1139200 A2 10/2001
EP 2 799 011 * 3/2014 ............. G06F 21/31
WO WO-2004/031920 A1 4/2004

OTHER PUBLICATIONS

Record of search history for search query performed in IP.com (performed Feb. 17, 2020).*

(Continued)

*Primary Examiner* — Sharon S Lynch
(74) *Attorney, Agent, or Firm* — Morgan, Lewis & Bockius LLP

(57) ABSTRACT

Some embodiments of the invention provide a method for authenticating a security device (e.g., a smart card or other highly secured device) to modify a security state (e.g., unlocking, decrypting, etc.) at a target device (e.g., laptop computers, mobile phones, tablets, etc.). In some embodiments, the security device does not have a volatile storage for storing volatile parameters for the particular device to use to perform the authentication process. The method of some embodiments sends an encrypted challenge to the security device, in which the encrypted challenge can only be decrypted by the security device. The method receives a response and modifies accessibility for the target device when the response is a valid response. The method of some embodiments determines that a response is valid based on the decrypted contents of the response and/or based on a period of time between the issuance of the challenge and the received response.

22 Claims, 9 Drawing Sheets

(56) References Cited

U.S. PATENT DOCUMENTS

| | | | |
|---|---|---|---|
| 5,721,779 A * | 2/1998 | Funk | G06F 21/31 380/30 |
| 6,088,450 A * | 7/2000 | Davis | G07C 9/28 713/182 |
| 6,708,272 B1 * | 3/2004 | McCown | H04L 9/083 380/278 |
| 6,959,390 B1 * | 10/2005 | Challener | H04L 9/0894 380/281 |
| 7,069,444 B2 * | 6/2006 | Lowensohn | G06F 21/35 713/185 |
| 7,110,393 B1 * | 9/2006 | Tripathi | H04L 29/06027 370/352 |
| 7,114,178 B2 | 9/2006 | Dent | |
| 7,178,025 B2 * | 2/2007 | Scheidt | G06F 21/31 705/67 |
| 7,549,044 B2 * | 6/2009 | Lee | G06F 21/10 380/201 |
| 7,603,556 B2 * | 10/2009 | Brown | H04L 9/3271 713/169 |
| 7,624,280 B2 | 11/2009 | Oskari | |
| 7,941,833 B2 * | 5/2011 | Zick | H04L 63/0853 713/186 |
| 8,074,072 B2 * | 12/2011 | Brown | H04L 9/3271 713/169 |
| 8,498,618 B2 * | 7/2013 | Ben Ayed | H04L 63/0492 455/41.2 |
| 8,806,616 B2 * | 8/2014 | Buer | G07C 9/20 726/20 |
| 8,966,269 B2 * | 2/2015 | Thom | G06Q 20/341 713/172 |
| 9,032,498 B1 * | 5/2015 | Ben Ayed | H04W 12/0609 726/9 |
| 9,277,259 B2 * | 3/2016 | Cocchi | H04N 21/8355 |
| 9,590,978 B2 | 3/2017 | Joyce, III | |
| 10,484,172 B2 * | 11/2019 | Sykora | H04L 9/3231 |
| 2002/0133704 A1 * | 9/2002 | Nendell | G06F 21/31 713/171 |
| 2003/0149666 A1 | 8/2003 | Davies | |
| 2003/0186681 A1 * | 10/2003 | Gabor | H04L 63/08 455/411 |
| 2003/0233546 A1 * | 12/2003 | Blom | G06Q 20/02 713/168 |
| 2004/0143737 A1 * | 7/2004 | Teicher | G06K 7/1095 713/167 |
| 2004/0230800 A1 * | 11/2004 | Futa | G06F 21/32 713/169 |
| 2005/0235148 A1 * | 10/2005 | Scheidt | G06F 21/31 713/168 |
| 2005/0250473 A1 * | 11/2005 | Brown | H04L 9/3271 455/411 |
| 2006/0156026 A1 * | 7/2006 | Utin | G06F 21/31 713/183 |
| 2007/0050622 A1 * | 3/2007 | Rager | G06F 21/445 713/168 |
| 2007/0118891 A1 * | 5/2007 | Buer | G06Q 20/24 726/8 |
| 2007/0150735 A1 * | 6/2007 | Futa | H04L 9/0844 713/171 |
| 2007/0180519 A1 * | 8/2007 | Boccon-Gibod | H04L 9/3271 726/21 |
| 2008/0063198 A1 * | 3/2008 | Jaquette | G06F 21/80 380/201 |
| 2008/0123863 A1 * | 5/2008 | Bade | G06F 21/6209 380/282 |
| 2008/0301445 A1 * | 12/2008 | Vasic | G06F 21/6245 713/171 |
| 2009/0002333 A1 * | 1/2009 | Maxwell | G06F 3/04883 345/173 |
| 2009/0240943 A1 * | 9/2009 | Brown | H04L 9/3271 713/171 |
| 2009/0319788 A1 * | 12/2009 | Zick | H04L 63/0853 713/168 |
| 2011/0035604 A1 * | 2/2011 | Habraken | G06F 21/34 713/193 |
| 2011/0084799 A1 | 4/2011 | Ficko | |
| 2011/0162082 A1 * | 6/2011 | Paksoy | G06F 21/60 726/26 |
| 2013/0018979 A1 * | 1/2013 | Cohen | H04L 67/125 709/217 |
| 2014/0289833 A1 * | 9/2014 | Briceno | H04L 63/08 726/7 |
| 2016/0285638 A1 * | 9/2016 | Pearson | H04L 9/3234 |
| 2016/0344710 A1 * | 11/2016 | Khan | H04L 63/061 |
| 2016/0371496 A1 * | 12/2016 | Sell | G06F 12/14 |
| 2017/0237563 A1 * | 8/2017 | El-Moussa | G06F 3/0659 713/193 |
| 2018/0039990 A1 * | 2/2018 | Lindemann | G06K 9/00892 |
| 2018/0041503 A1 * | 2/2018 | Lindemann | H04L 63/0435 |
| 2018/0144147 A1 * | 5/2018 | Nix | H04L 9/0869 |
| 2018/0191501 A1 * | 7/2018 | Lindemann | H04L 9/3271 |
| 2018/0191695 A1 * | 7/2018 | Lindemann | G06F 3/0647 |
| 2018/0330109 A1 * | 11/2018 | Nix | H04L 63/0853 |
| 2019/0087594 A1 * | 3/2019 | Nix | H04W 12/0023 |
| 2019/0220611 A1 * | 7/2019 | Nix | H04L 9/006 |
| 2019/0253404 A1 * | 8/2019 | Briceno | H04L 9/0869 |

OTHER PUBLICATIONS

Search Query Report from IP.com (performed Jun. 20, 2020).*
STIC Search Report from Search Assistance Requested on Jun. 12, 2020.*
Search Query Report from IP.com (performed Dec. 1, 2020) (Year: 2020).*

* cited by examiner

MODIFYING SECURITY STATE WITH HIGHLY SECURED DEVICES

CROSS-REFERENCE TO RELATED APPLICATION

This application is a continuation of U.S. application Ser. No. 15/892,287, filed Feb. 8, 2018, which claims the benefit of U.S. Provisional Application No. 62/464,313, filed Feb. 27, 2017, all of which are hereby incorporated by reference in their entirety for all purposes.

BACKGROUND

In order to provide a balance of security and convenience, a trusted device (e.g., key fobs, mobile devices, wearable devices, etc.) may be used to unlock (or otherwise modify a security state) a target device. In many cases, the trusted device provides a memory along with a general processor and security software for handling authentication measures with the target device. However, such memories and software can be vulnerable to malicious attackers who can read the memories or corrupt the authentication software in order to gain unauthorized access to the target device. In order to provide a higher level of security that is not subject to such vulnerabilities, highly secured devices (e.g., smart cards, hardware encryption devices, etc.) are used to authenticate a user at a target device. In some cases, the highly secured devices lack a stateful memory to track the target devices. It is desirable to provide more secure methods for modifying the security state of a target device using such highly secured devices.

BRIEF SUMMARY

Some embodiments of the invention provide a method for authenticating a security device (e.g., a smart card or other highly secured device) to modify a security state (e.g., unlocking, decrypting, etc.) at a target device (e.g., laptop computers, mobile phones, tablets, etc.). In some cases, the security device is a device that is provided with a guarantee that the security device's private secret cannot be accessed by a device external to the security device. The security device of some embodiments does not include a volatile storage for storing volatile parameters for the particular device to use in performing an authentication process. By not providing such a volatile storage, the security device is capable of maintaining a higher level of security, as no sensitive information (e.g., keys, etc.) related to the target device is stored on the security device.

In some embodiments, the method for authenticating the security device begins by establishing a connection with the security device (e.g., determines that a smart card has been inserted into a card reader of the target device, has been wirelessly detected within a particular range of the target device, etc.). In some embodiments, the method initiates an exchange with the security device to identify a public value (e.g., a public key, identifier, etc.) for the security device when the security device is detected.

Upon determining that the connection with the security device has been established, the method of some embodiments sends a challenge to the security device to authenticate the security device. In some embodiments, the challenge includes a verification value that is encrypted such that only the security device is able to decrypt the encrypted verification value. For example, in some embodiments, the challenge is encrypted using a shared key that is generated (e.g., using an elliptic curve Diffie-Hellman (ECDH) protocol) based on a combination of public values that are shared between the target and security devices and private secret values unique to the target and security devices. In some embodiments, the challenge is encrypted using a public key of the security device such that the encrypted challenge can only be decrypted (e.g., using a RSA protocol) with a private secret key embedded in the security device. In some embodiments, a new encrypted challenge is used for each attempt to authenticate the security device so that an attacker cannot use an old version of an encrypted challenge to impersonate the security device.

In some embodiments, the security device processes the challenge to retrieve the verification value and to return a response that includes the verification value. The method of some embodiments receives the response from the security device and determines whether the response is a valid response. In some embodiments, the method determines whether the response is valid by determining whether the verification value of the response matches the verification value that was sent in the challenge. In some embodiments, an unlock record (e.g., a security token, authorization information, a master key, etc.) for modifying accessibility of the target device is encrypted based on the verification value, so if an incorrect verification value is returned, the target device is unable to retrieve the unlock record to unlock the target device.

The method of some embodiments determines whether the response is a valid response based on whether a period of time, greater than a threshold period of time, has passed since the challenge was sent to the security device. In some embodiments, the method measures the time for the response based on an expected amount of time for processing the challenge. The constraint on the time to respond ensures that there is sufficient time for the security device to generate a response, but insufficient time for an attacker to attack the challenge and retrieve the verification value.

When the response is determined to be a valid response, the method of some embodiments modifies accessibility (or a security state) for the target device. In some embodiments, the authentication process further requires additional authentication information (e.g., passwords, passcodes, biometric information, etc.) from a user of the security device before authenticating the security device and modifying the accessibility to the target device. In some embodiments, when the response is valid, the method modifies the accessibility in various ways, such as unlocking the device, decrypting files at the device, providing elevated security access to the device, etc. In some embodiments, when the response is not a valid response, the method unregisters the security device, forcing the security device to re-register with the target device.

In some embodiments, before a security device can be used to modify the accessibility to a target device, the security device needs to be registered as a trusted device with the target device. The registration process allows a user to grant the security device permission to unlock (or otherwise modify the security state of) the target device. The method of some embodiments registers the security device by receiving a public value (e.g., a public key, identifier, etc.) of the security device and generating an encrypted verification value to be used to authenticate the security device. In some embodiments, the registration process further requires additional authentication information (e.g., passwords, passcodes, biometric information, etc.) from a user of the security device to register the device. The encrypted verification value of some embodiments is encrypted with the public value so that only the security device can decrypt it using a private secret (e.g., a private key or a shared key generated based on information received from the target device) of the security device.

In some embodiments, the encrypted verification value is a part of a larger set of registration information that includes other encrypted data that is stored for each registered security device. For example, in some embodiments the encrypted set of data includes an encrypted version of an unlock record that can be used to modify the accessibility of the target device, and the verification value is a key that is used to encrypt and decrypt the unlock secret.

In addition to the encrypted set of data for each security device, the method of some embodiments stores an unencrypted set of data related to the security device. The unencrypted set of data of some embodiments includes one or more of the public value for the security device, a counter associated with the encrypted verification value, and a mode identifier that identifies an encryption protocol used by the security device. The counter is used to ensure that each challenge issued to the security device (e.g., each time the security device is used to unlock the target device), is unique.

Once the encrypted set of data has been generated, the method of some embodiments associates the encrypted set of data with the public value of the security device in a storage at the target device. For example, in some embodiments the encrypted verification value is stored in a table that is indexed based on a public key of the security device so that the encrypted verification value can be easily accessed when the security device is detected. In some embodiments, when the security device is subsequently used to modify the accessibility of the target device, the method retrieves the encrypted verification value from the table based on the public key, and sends the encrypted verification value as part of a challenge to the security device.

In some embodiments, the target device is a secured device with highly secured resources (e.g., a Secure Enclave Processor (SEP), secured storage, etc.). In some embodiments, the highly secured resources include a secure memory that is only accessible by a set of security processing units. In some such embodiments, the encrypted set of data for each registered security device is stored in the lower security storage, but is encrypted such that it can only be decrypted using the highly secured resources. In some embodiments, the registration information (including the encrypted and unencrypted data) is stored at the lower level security storage, but the encrypted portion of the registration information is encrypted using a key that is only accessible by the highly secured resources.

In some embodiments, once the security device has been authenticated, the method modifies the accessibility by authorizing a set of restricted operations or providing a higher level of security access at the target device. Once the authentication process is complete (successfully or unsuccessfully), the method of some embodiments updates the registration information associated with the security device. For example, in some embodiments, the method modifies the counter and generates a new encrypted verification value, such that a subsequent challenge provided to the security device uses a different verification value.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description further describe the embodiments described in the Summary as well as other embodiments. Accordingly, to understand all the embodiments described by this document, a full review of the Summary, the Detailed Description, and the Drawings is needed. Moreover, the claimed subject matters are not to be limited by the illustrative details in the Summary, the Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
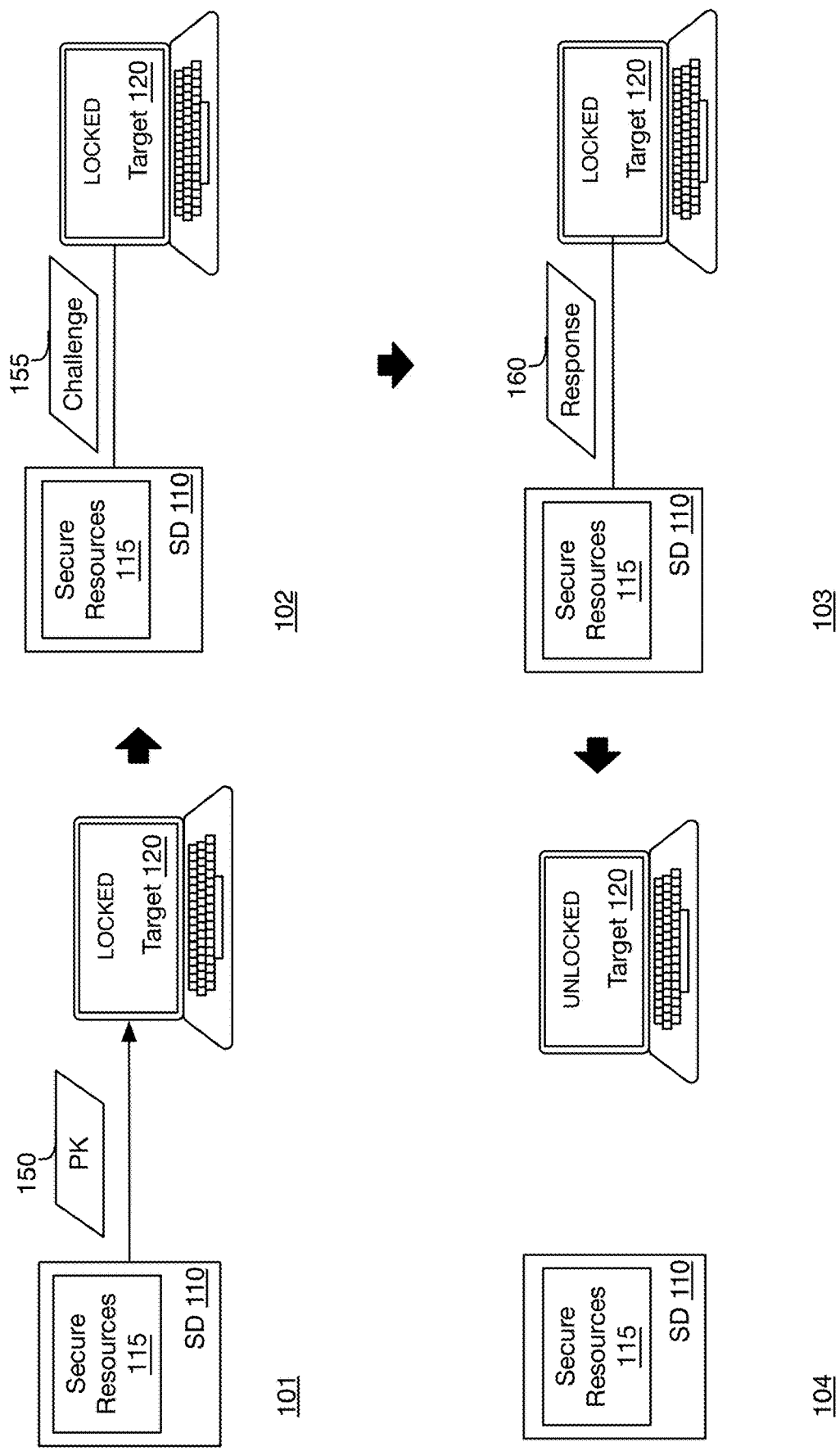
FIG. 1 illustrates an example of authenticating a security device to unlock a target device.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method for authenticating a security device (e.g., a smart card or other highly secured device) to modify a security state (e.g., unlocking, decrypting, etc.) at a target device (e.g., laptop computers, mobile phones, tablets, etc.). In some cases, the security device is a device that is provided with a guarantee that the security device's private secret cannot be accessed by a device external to the security device. The security device of some embodiments does not include a volatile storage for storing volatile parameters for the particular device to use in performing an authentication process. By not providing such a volatile storage, the security device is capable of maintaining a higher level of security, as no sensitive information (e.g., keys, etc.) related to the target device is stored on the security device.

In some embodiments, the method for authenticating the security device begins by establishing a connection with the security device (e.g., determines that a smart card has been inserted into a card reader of the target device, has been wirelessly detected within a particular range of the target device, etc.). In some embodiments, the method initiates an exchange with the security device to identify a public value (e.g., a public key, identifier, etc.) for the security device when the security device is detected.

Upon determining that the connection with the security device has been established, the method of some embodiments sends a challenge to the security device to authenticate the security device. In some embodiments, the challenge includes a verification value that is encrypted such that only the security device is able to decrypt the encrypted verification value. For example, in some embodiments, the challenge is encrypted using a shared key that is generated (e.g., using an elliptic curve Diffie-Hellman (ECDH) protocol) based on a combination of public values that are shared between the target and security devices and private secret values unique to the target and security devices. In some embodiments, the challenge is encrypted using a public key of the security device such that the encrypted challenge can only be decrypted (e.g., using a RSA protocol) with a private secret key embedded in the security device. In some embodiments, a new encrypted challenge is used for each attempt to authenticate the security device so that an attacker cannot use an old version of an encrypted challenge to impersonate the security device.

In some embodiments, the security device processes the challenge to retrieve the verification value and to return a response that includes the verification value. The method of some embodiments receives the response from the security device and determines whether the response is a valid response. In some embodiments, the method determines whether the response is valid by determining whether the verification value of the response matches the verification value that was sent in the challenge. In some embodiments, an unlock record (e.g., a security token, authorization information, a master key, etc.) for modifying accessibility of the target device is encrypted based on the verification value, so if an incorrect verification value is returned, the target device is unable to retrieve the unlock record to unlock the target device.

The method of some embodiments determines whether the response is a valid response based on whether a period of time, greater than a threshold period of time, has passed since the challenge was sent to the security device. In some embodiments, the method measures the time for the response based on an expected amount of time for processing the challenge. The constraint on the time to respond ensures that there is sufficient time for the security device to generate a response, but insufficient time for an attacker to attack the challenge and retrieve the verification value.

When the response is determined to be a valid response, the method of some embodiments modifies accessibility (or a security state) for the target device. In some embodiments, the authentication process further requires additional authentication information (e.g., passwords, passcodes, biometric information, etc.) from a user of the security device before authenticating the security device and modifying the accessibility to the target device. In some embodiments, when the response is valid, the method modifies the accessibility in various ways, such as unlocking the device, decrypting files at the device, providing elevated security access to the device, etc. In some embodiments, when the response is not a valid response, the method unregisters the security device, forcing the security device to re-register with the target device.

In some embodiments, before a security device can be used to modify the accessibility to a target device, the security device needs to be registered as a trusted device with the target device. The registration process allows a user to grant the security device permission to unlock (or otherwise modify the security state of) the target device. The method of some embodiments registers the security device by receiving a public value (e.g., a public key, identifier, etc.) of the security device and generating an encrypted verification value to be used to authenticate the security device. In some embodiments, the registration process further requires additional authentication information (e.g., passwords, passcodes, biometric information, etc.) from a user of the security device to register the device. The encrypted verification value of some embodiments is encrypted with the public value so that only the security device can decrypt it using a private secret (e.g., a private key or a shared key generated based on information received from the target device) of the security device.

In some embodiments, the encrypted verification value is a part of a larger set of registration information that includes other encrypted data that is stored for each registered security device. For example, in some embodiments the encrypted set of data includes an encrypted version of an unlock record that can be used to modify the accessibility of the target device, and the verification value is a key that is used to encrypt and decrypt the unlock secret.

In addition to the encrypted set of data for each security device, the method of some embodiments stores an unencrypted set of data related to the security device. The unencrypted set of data of some embodiments includes one or more of the public value for the security device, a counter associated with the encrypted verification value, and a mode identifier that identifies an encryption protocol used by the security device. The counter is used to ensure that each challenge issued to the security device (e.g., each time the security device is used to unlock the target device), is unique.

Once the encrypted set of data has been generated, the method of some embodiments associates the encrypted set of data with the public value of the security device in a storage at the target device. For example, in some embodiments the encrypted verification value is stored in a table that is indexed based on a public key of the security device so that the encrypted verification value can be easily accessed when the security device is detected. In some embodiments, when the security device is subsequently used to modify the accessibility of the target device, the method retrieves the encrypted verification value from the table based on the public key, and sends the encrypted verification value as part of a challenge to the security device.

In some embodiments, the target device is a secured device with highly secured resources (e.g., a Secure Enclave Processor (SEP), secured storage, etc.). In some embodiments, the highly secured resources include a secure memory that is only accessible by a set of security processing units. In some such embodiments, the encrypted set of data for each registered security device is stored in the lower security storage, but is encrypted such that it can only be decrypted using the highly secured resources. In some embodiments, the registration information (including the encrypted and unencrypted data) is stored at the lower level security storage, but the encrypted portion of the registration information is encrypted using a key that is only accessible by the highly secured resources.

In some embodiments, once the security device has been authenticated, the method modifies the accessibility by authorizing a set of restricted operations or providing a higher level of security access at the target device. Once the authentication process is complete (successfully or unsuccessfully), the method of some embodiments updates the registration information associated with the security device. For example, in some embodiments, the method modifies the counter and generates a new encrypted verification value, such that a subsequent challenge provided to the security device uses a different verification value.

Examples of the authentication and registration processes are described below. Section I describes a method for registering and authenticating a security device for modifying accessibility to a target device. Section II describes an example of an electronic system that implements some embodiments described herein.

I. Modifying Accessibility Using a Security Device

Some embodiments of the invention provide a method for authenticating a security device (e.g., a smart card or other highly secured device) to modify a security state at a target device (e.g., laptop computers, mobile phones, tablets, etc.). For example, in some embodiments, the security device is used to unlock the target device. In other embodiments, rather than unlocking the device, the target device modifies its accessibility by moving the target device from a high-level security state to a lower-level security state. In some cases, the target device remains locked during the shift, but the lower-level security state provides additional access to information on the target device. For example, in some embodiments, the target device provides minimal notifications on a lock screen (i.e., the displayed screen when the device is locked) in the higher-level security state, where any potentially sensitive information is hidden until the device is unlocked. By shifting to the lower-level security state (e.g., in the presence of a trusted device), the target device of some embodiments provides a user of the target device with access to more sensitive information for the notifications (e.g., text excerpts, senders, etc.).

In other embodiments, rather than providing additional information in a locked state, the different security states allow a trusted device to lower the security requirements for accessing the target device. For example, in some embodiments, a target device that normally requires an alphanumeric password can be configured to require a simpler pin code. In some embodiments, even when the target device is already unlocked, the trusted device and the security state shift are used to provide access to an application or to sensitive data within an application (e.g., browser histories, auto-fill data, credit card information, etc.) when the trusted device is within the particular range. Several of the examples below describe an unlock operation on the target device, but one skilled in the art will recognize that the novelty of the invention can be applied to various different methods for changing the accessibility of the target device.

FIG. 1 illustrates an example of authenticating a security device to unlock a target device in four stages 101-104. In this example, the target device 120 is shown as a laptop computer that is in a locked state. The security device 110 is a device (e.g., a smart card, etc.) that can be used to authorize changes to the accessibility (or the security state) of a target device 120.

In some embodiments, the security device 110 includes specialized secure resources 115 used for performing security operations (e.g., encryption, decryption, authentication, etc.). In some cases, the secure resources 115 include an embedded integrated circuit (e.g., a secure microcontroller) and a secure memory (e.g., an internal memory, a hardware memory chip, etc.). The security device 110 of some embodiments stores a private secret (e.g., a private key) in the secure resources 115 to perform security operations (using the embedded integrated circuit) with another device. The security device 110 of some embodiments is provided with a guarantee that the private secret cannot be accessed by a device external to the security device.

The secure resources 115 of some embodiments do not include any additional volatile storage for storing volatile parameters (e.g., device state information) related to any other devices involved in the security operation. By not providing such volatile storage, the security device 110 is capable of maintaining a high level of security, as no sensitive information (e.g., keys, etc.) related to the target device 120 is stored on the security device 110.

In the first stage 101, the security device 110 sends a public key 150 to the target device 120. The public key 150 of some embodiments is a public value (e.g., public key, device identifier, etc.) that is used to identify the security device 120. In some embodiments, the target device 120 authorizes (or registers) one or more security devices, and the public key 150 is used to access the corresponding authentication information used to authenticate each security device.

The second stage 102 shows that the target device 120 then sends a challenge 155 back to the security device 110 based on the public key 150. The challenge 155 is used to verify that the security device 150 is a security device that is authorized to modify accessibility to the target device 120. In some embodiments, the public key 150 is used to generate a challenge that is used to authenticate the security device. In other embodiments, public key 150 is used to identify a previously generated challenge (e.g., during a registration process or after a previous authentication attempt with security device 120) to be processed by the security device 110. The challenge 155 of some embodiments includes an encrypted verification value that is encrypted with public key 150 such that only the security device 120 can decrypt it using a private secret (e.g., a private key or a shared key generated based on information received from the target device) of the security device 110.

In the third stage 103, the security device 110 processes the challenge 155 and returns a response 160. In some embodiments, the security device 110 decrypts an encrypted verification value from the challenge 155 and returns the decrypted value back to the target device 120. The target device 120 then receives and validates the response 160 to determine whether the response 160 is a valid response to the issued challenge 155. In some embodiments, the target device 120 validates the response 160 by determining whether a response is timely (e.g., received within a threshold period of time) or whether a decrypted verification value in the response matches an expected verification value from the challenge.

Finally, the fourth stage 104 shows that the target device 120 has been unlocked. In some embodiments, the authentication of the security device is one part of a multi-step authentication. In some such embodiments, the target device 120 requires additional authentication information (e.g., a passcode, password, biometric information, etc.) from the user of the device before being allowing access to the target device 120.

In order to ensure that only authorized security devices can be used to modify the accessibility to a target device, some embodiments provide a method for registering one or more trusted security devices with a target device. The registration process allows a user to grant the security device permission to unlock (or otherwise modify the security state of) the target device. As the security device may lack any volatile storage to store any state data related to the target device, the registration process of some embodiments stores all of the necessary authentication information for the authentication process at the target device.

Figure 2:
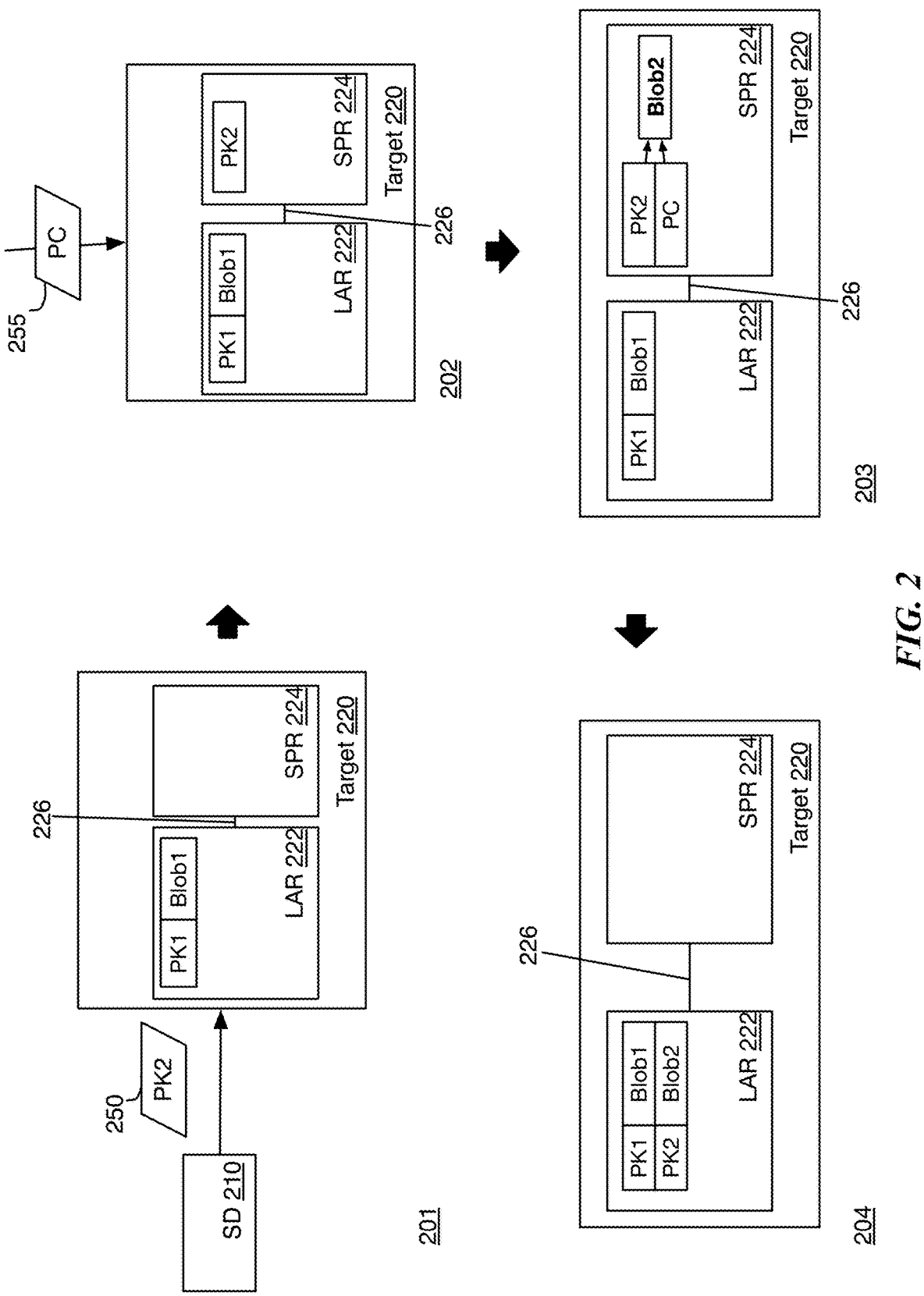
FIG. 2 illustrates an example of registering a security device with a target device.

FIG. 2 illustrates an example of registering a security device as a trusted device in four stages 201-204. The example of FIG. 2 is similar to the example of FIG. 1, but in this example the target device 220 is shown with local authentication resources (LAR) 222 and secure processor resources (SPR) 224. In some embodiments, the LAR 222 includes a local authentication engine that uses the target device's standard resources (e.g., processors, memory, etc.) to provide authentication services.

The secured processing resources (SPR) 224 in some embodiments are a specialized set of processing resources that are dedicated to high security applications on the target device 220. The SPR 224 of some embodiments include a coprocessor that uses encrypted memory and other secure hardware features (e.g., a hardware random number generator) to provide cryptographic operations for the target device. Unlike the application memory, SPR 224 includes a high security, encrypted memory that maintains the integrity of the protected data, even if the kernel has been compromised. In some such embodiments, the only method for communication between LAR 222 and SPR 224 is through a highly secured communication channel 226.

Several of the examples are described with the separate LAR 222 and SPR 224. In some embodiments, the LAR 222 serves as a proxy between the security device and the SPR 224, but the SPR 224 performs all of the validation and authentication processes of the invention. However, the invention is not limited to such environments. Some embodiments of the invention are performed without separate secure processor resources, but are rather performed entirely by the local authentication resources 222.

The first stage 201 shows that the security device 210 sends a public value 250 (e.g., a public key, identifier, etc.) to the target device 220. The public value 250 is used to register the security device 210 with the target device 220. In some embodiments, the target device 220 registers a device by storing a blob (an encrypted set of authentication data) associated with the security device 210 at the target device 220. In some embodiments, the blob is unreadable by the LAR 222 such that all of the validation and authentication operations must be performed by the SPR 224.

In some embodiments, target device 220 can register multiple security devices to modify accessibility at the target device 220. In this example, the LAR 222 shows a blob Blob 1 that contains authentication data for another security device (not shown) with a public value PK2. In some embodiments, different security devices can be associated with different users and/or may provide different levels of accessibility to the target device 120. For example, a first device may unlock the target device, while a different second device is used to decrypt the contents of a protected folder on the target device. Each of the different security devices is identified based on the public value (or some other identifier) that can be retrieved from the security device 110 when the authentication process is initiated.

The second stage 202 shows that a passcode 255 (or other additional authentication information such as passwords, passcodes, biometric information, etc.) is received from a user at the target device 220 to register the security device 210 as a trusted device that is authorized to modify the accessibility of target device 220.

In the third stage 203, the target device 220 uses the SPR 224 to generate a blob 260 associated with security device 210 based on the public value PK2 and the passcode PC. The blob 260 of some embodiments contains various authentication information for subsequent attempts to authenticate the security device 210. In some embodiments, blob 260 includes encrypted and unencrypted portions with various authentication information. For example, the blob 260 of some embodiments includes an encrypted challenge that is encrypted such that it cannot be decrypted by the LAR 222. The SPR 224 of some embodiments accesses the encrypted portion of the blob 260 (e.g., using a key that is stored in, and only accessible from, the SPR 224) to issue a challenge blob to the security device. In some embodiments, the unencrypted portion of the blob 260 includes other various information that indicates properties (e.g., an encryption mode, a version, etc.) for the security device. Whenever the passcode is changed, the passcode derives the master key, which decrypts the unlock secret. The unlock secret can then be re-encrypted with the new master key that is derived from the new passcode.

In addition to the blob 260 stored in the LAR 222, the target device 220 of some embodiments stores a corresponding escrow record in the SPR 224 that stores an encrypted master key that is used to modify the accessibility of the target device 220. The structure of the blob and the escrow record of some embodiments is described in further detail below with reference to FIG. 3. The process for authenticating a security device is described in further detail below with reference to FIGS. 4 and 5.

The fourth stage 204 shows that the target device 220 stores the generated blob 260 in the LAR 222, using the public value PK2 as an identifier for security device 210. Storing the generated blob with encrypted authentication data that can only be accessed by the SPR 224 allows the target device 220 to store the authentication data for the security devices in the lower security LAR 222, rather than using the specialized resources of the SPR 224, without compromising the security of the authentication data. Even if an attacker were to access the blob from the memory of the LAR 220, the attacker would be unable to decrypt the blob to access the authentication data without breaking the security of the high-security SPR 224.

Figure 3:
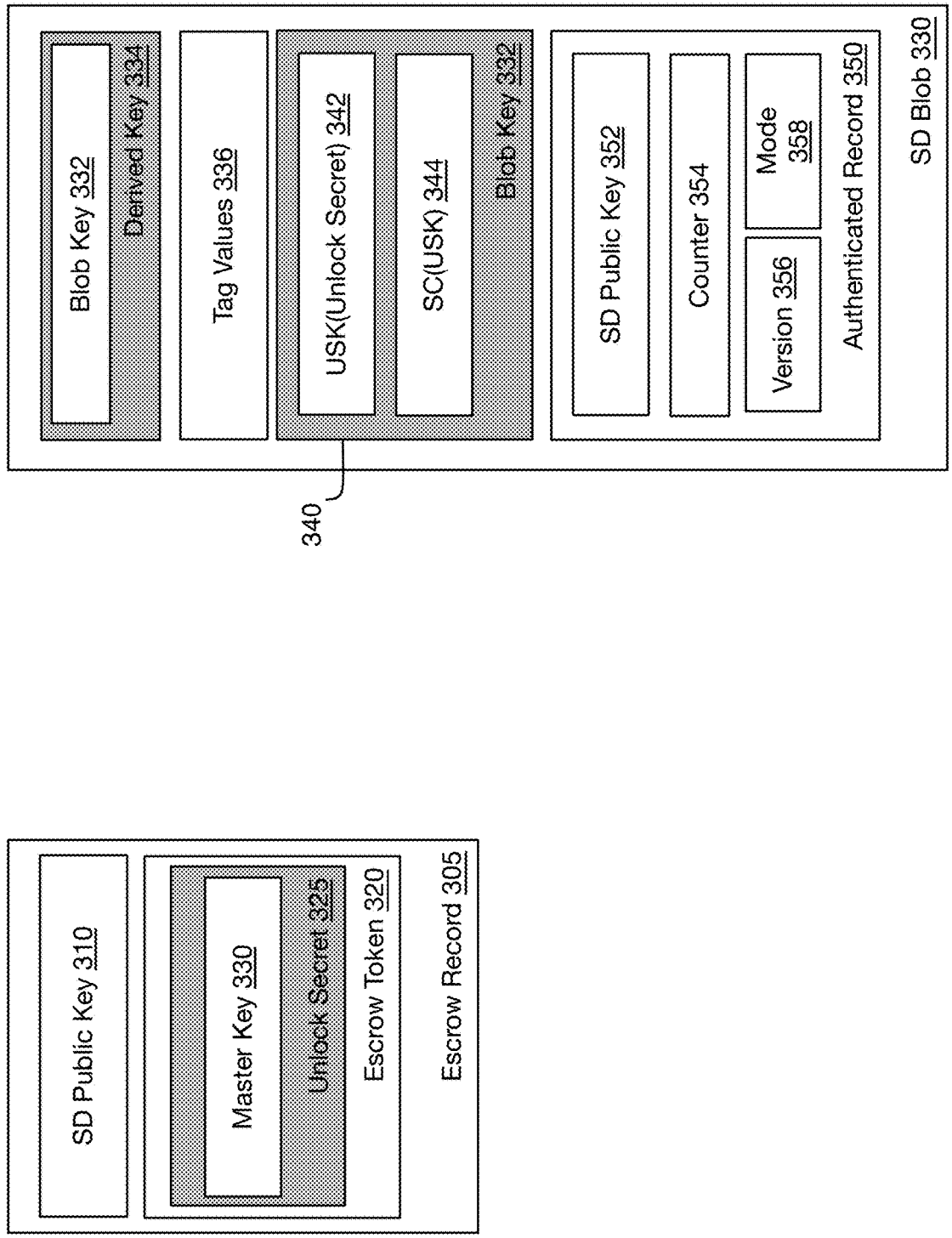
FIG. 3 illustrates examples of data structures stored during the registration process.

FIG. 3 illustrates examples of data structures stored during the registration process for an associated security device. More specifically, this example shows data structures for an escrow record 305, which stores a master key for the associated security device, and a blob 330, which stores additional authentication data for the associated security device. As described above, the escrow record 305 of some embodiments is stored in the secure processing resources (SPR) of the target device, while the blob 330 is stored in the local authentication resources (LAR), allowing for a high level of security and an efficient use of the specialized resources of the SPR.

The escrow record 305 includes a public key 310 for the security device and an escrow token 320. The security device public key 310 is a public value (e.g., a public key, identifier, etc.) associated with a security device that is used to identify a source of an authentication request from a security device and/or to generate a challenge that is used to authenticate the security device. The escrow token 320 of some embodiments includes a master key 330 that is encrypted (shown in gray) with an unlock secret 325 (e.g., a security token, authorization information, a master key, etc.). The master key 330 of some embodiments is used to perform the actual modification to the accessibility of the device. For example, in some embodiments, the master key is used to decrypt a group of keys, which are used to encrypt various files of the target system or to unlock the target device.

In some embodiments, the unlock secret 325 is a randomly generated key that is used to encrypt the master key 330 for a particular security device. The target device uses the unlock secret 325 to encrypt the master key for the escrow token and then encrypts the unlock secret as a part of the blob 330. The unlock secret 325 of some embodiments is then discarded, so that it is no longer directly available to the SPR of the target device, hiding the unlock key so that it can only be retrieved using the associated security device. In order to retrieve the master key from the SPR, the unlock secret 325 must be decrypted by the security device.

The security device blob 330 includes a blob key 332, tag values 334, an encrypted record 340, and an authenticated record 350. The blob key 332 is used to encrypt the encrypted record 340 of the security device blob 330. The blob key 332 itself is encrypted with a derived key 334. The derived key 334 of some embodiments is derived from keys stored at the SPR, which can only be decrypted by the SPR. In this manner, the encrypted record 340 is hidden from the LAR, and cannot be accessed by an attacker even if the target device is compromised.

Tag values 336 include a set of values that are used to authenticate encrypted record 340 and authenticated record 350. Authenticating the encrypted record 340 and the authenticated record 350 ensures that the contents of the record are not changed. For example, in some embodiments, the tag values 336 include hash values of the contents of the different records, such that any changes to the records will result in a different hash value and fail to be authenticated.

Encrypted record 340 includes information that is used to authenticate the security device and modify the accessibility of the target device. Specifically, encrypted record 340 includes an encrypted unlock secret 342 and an encrypted unlock secret key (USK) 344. The unlock secret, as described above, is used to encrypt the master key in the escrow record 305. The unlock secret 342 is encrypted using the USK. Both the encrypted unlock secret 342 and the encrypted unlock secret 344 are further encrypted using the blob key 332 so that the encrypted record 340 and the encrypted unlock secret 344 can only be retrieved using the SPR of the target device.

The encrypted USK 344 is encrypted such that only the associated secure device is able to decrypt the USK. In some embodiments, the USK is encrypted using a public key of the security device and can be decrypted using the corresponding private key. In other embodiments, the USK is encrypted using a shared key that is generated based on the public value of the security device.

Authenticated record 350 of some embodiments includes additional authentication information that is authenticated (using tag values 336), but not encrypted. By authenticating the authenticated record 350 and not encrypting it, the contents cannot be modified, yet remain visible to the normal, lower security, application resources (e.g., LAR) of the target device. In this example, authenticated record 350 includes the security device public key 352, a counter 354, version 356, and mode 358. The counter 354 is used to ensure that each challenge issued to the security device (e.g., each time the security device is used to unlock the target device), is unique. In some embodiments, the counter 354 is incremented with each unlock attempt, to ensure that a same response cannot be reused by a compromised security device. The mode 358 indicates the encryption method used by the security device and the version 356 indicates the version of the encryption method. The mode and version information is used by the target device to generate a challenge that can be solved by the target device.

By maintaining a separate escrow record 305 and blob 330 in the SPR and the LAR respectively, the target device is able to store only a minimal amount of information in the SPR, while maintaining the majority of the authentication information in the blob LAR. The minimal amount stored in the SPR, however, allows the target device to keep the master key in the high security SPR, without ever exposing it to potential attacks on the LAR. In addition, encrypting various portions of the blob 330 allows a more complete set of data for authenticating different security devices to be stored in the LAR, without exposing the authentication information to a potentially compromised device.

Figure 4A:
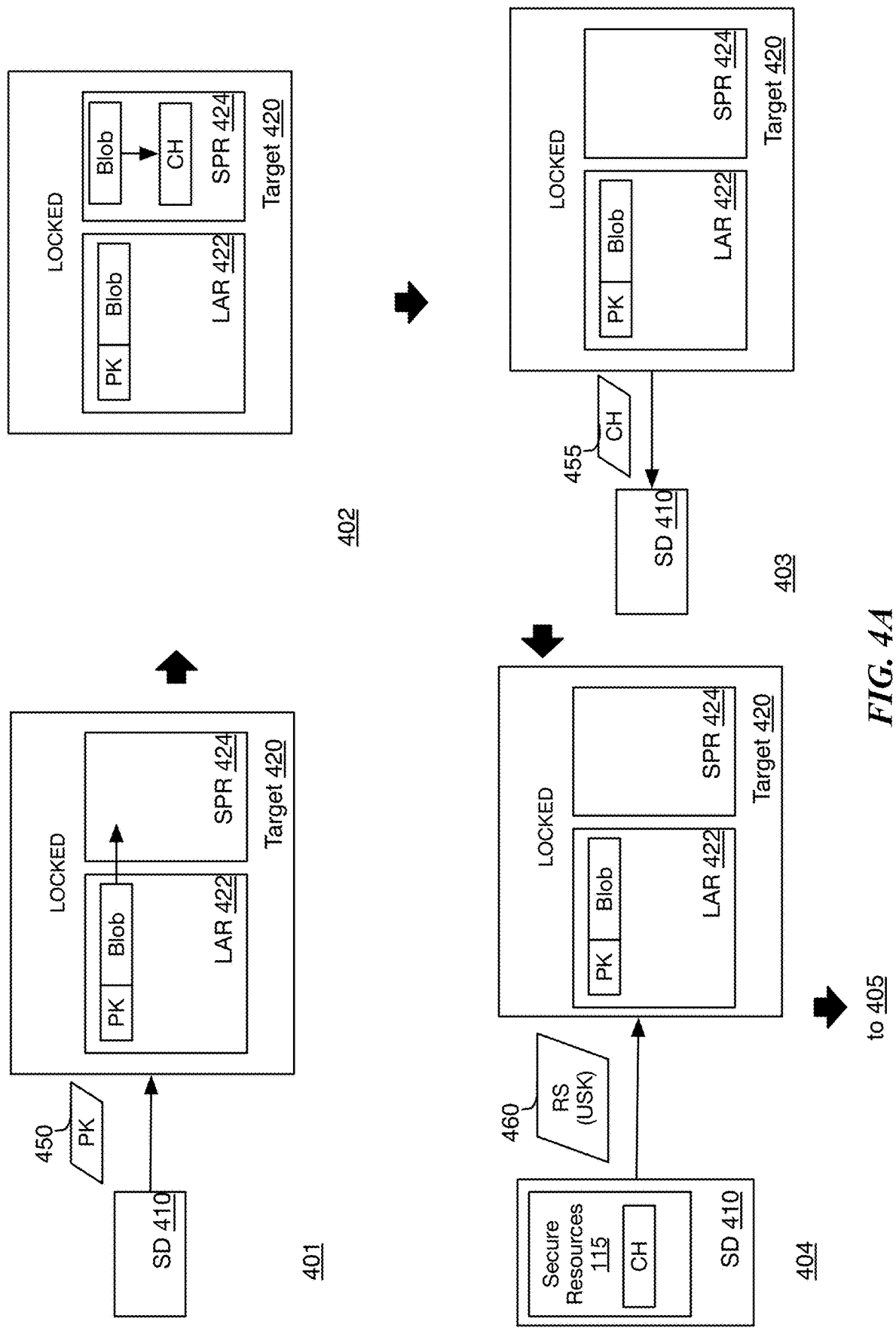
FIGS. 4A-B illustrate an example of a target device with secured memory that authenticates a security device to modify accessibility to the target device.
Figure 4B:
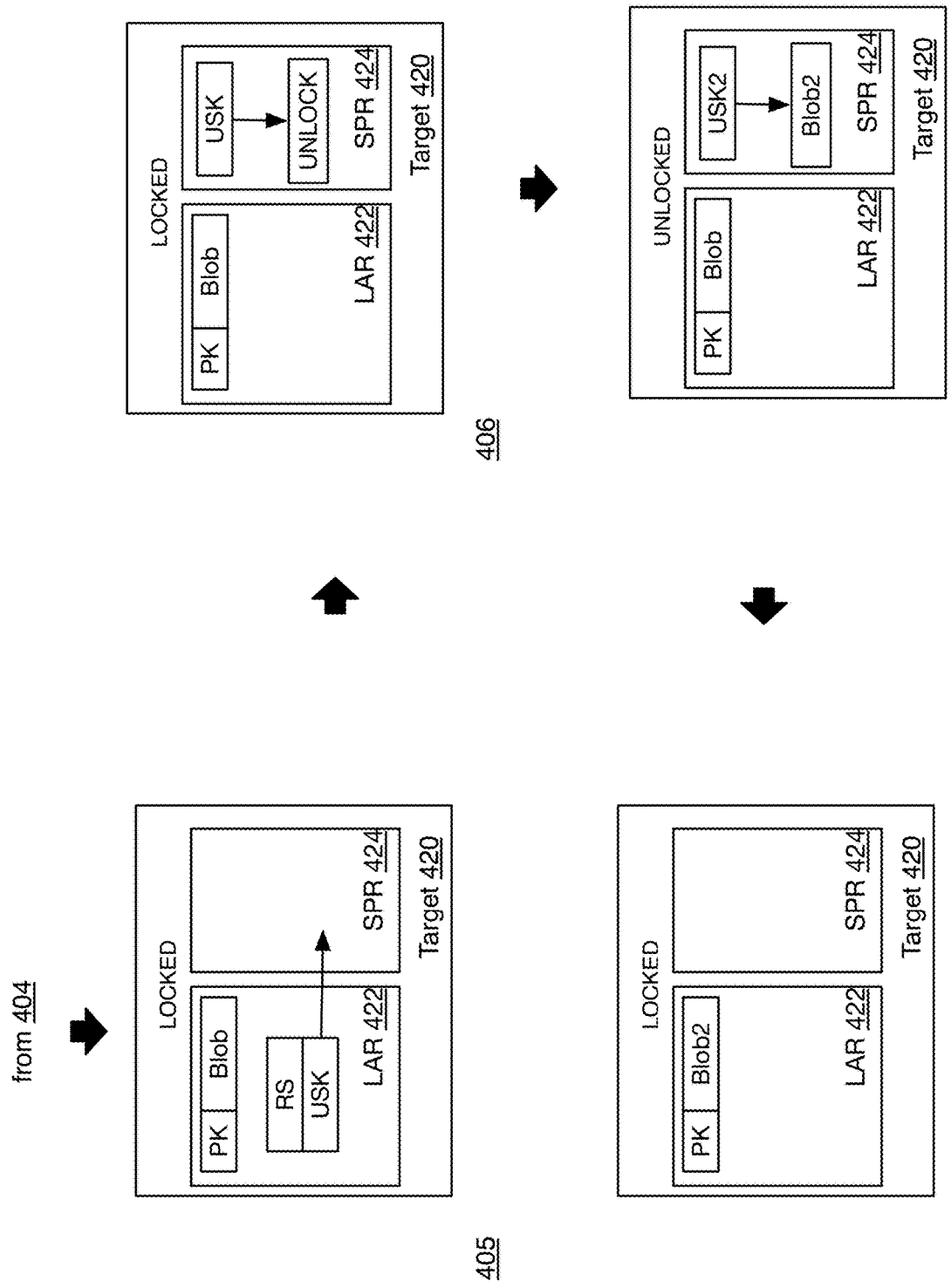

FIGS. 4A-B illustrate an example of a target device with secured memory that authenticates a security device to modify accessibility of the target device in eight stages 401-408. In some embodiments, the target device 410 is a secured device with lower level processing resources (e.g., memory, processing units, etc.) for running applications (e.g., authentication, kernel, user apps, etc.) and a separate set of secure processing resources (e.g., a Secure Enclave Processor (SEP), secured storage, etc.) for performing security operations. In some embodiments, the SPR includes a set of secure processing units (or a secure coprocessor) and a secure memory that is only accessible by the set of security processing units.

The first stage 401 shows that the target device 420 retrieves the public key 450 from the security device 410 when the security device 410 is detected by the target device 420 (e.g., when the security device 410 moves within a particular range of the target device 420, when the security device 410 is inserted into a reader of the target device 420, etc.). The target device 420, upon receiving the public key 450, determines whether the security device 410 is authorized to modify the accessibility of the target device 420. In some embodiments, the target device 420 determines whether a security device 410 is authorized by determining, based on the received public key 450, whether a corresponding blob for the security device 410 is stored at the target device 420. In the first stage 401, the target device 420 moves the blob corresponding to the public key 450 from a set of local authentication resources (LAR) 422 to the SPR 424 because portions of the blob are encrypted and cannot be read from the LAR 422.

In the second stage 402, the target device 420 uses the SPR 424 to generate a challenge 465. In some embodiments, the target device 420 generates the challenge 465 by decrypting the blob, and extracting an encrypted challenge from the blob 460. The encrypted challenge and the blob 460 of some embodiments are generated by the SPR 424 during a registration process or after a previous authentication attempt by the security device 410. In some embodiments, the target device 420 generates a new encrypted challenge for each attempt to authenticate the security device so that an attacker cannot use an old version of an encrypted challenge to impersonate the security device 410. In other embodiments, an encrypted challenge is used for a specified number of attempts, but an additional counter is maintained to ensure that old versions of the encrypted challenge cannot be reused.

In some embodiments, the challenge 465 includes a verification value (e.g., an unlock secret key, a random number, etc.) that is encrypted such that only the security device is able to decrypt and return the verification value. For example, in some embodiments, the challenge is encrypted using a shared key that is generated (e.g., using an elliptic curve Diffie-Hellman (ECDH) protocol) based on a combination of public values (e.g., keys) that are exchanged between the target and security devices, and private secret values unique to the target and security devices. In other embodiments, the challenge 465 is encrypted using a public key of the security device such that the encrypted challenge 465 can only be decrypted (e.g., using a RSA protocol) with a private secret key embedded in the security device 410.

The third stage 403 shows that the target device 420 sends the encrypted challenge 455 to the security device 410 to authenticate the security device 410. In the fourth stage 404, the security device 410 then uses its secure resources 415 to decrypt the challenge and return a response 460 that includes the decrypted verification value (e.g., an unlock secret key).

In some embodiments, the target device 420 then validates the response 475 to determine whether the response is a valid response. In some embodiments, the target device 420 validates the response by attempting to decrypt an unlock secret using the decrypted verification value. If the decrypted verification value is incorrect (e.g., when an attacker is trying to impersonate the security device 410), the decryption fails to produce the correct unlock secret for modifying accessibility. In some embodiments, when the response is not a valid response, the target device 420 unregisters the security device, forcing the security device 410 to re-register with the target device 420.

The target device 420 of some embodiments determines whether the response is a valid response based on whether a threshold period of time has passed since the challenge was sent to the security device. In some embodiments, the target device 420 measures the time for the response based on an expected amount of time for processing the challenge. The constraint on the time to respond ensures that there is sufficient time for the security device to generate a response, but insufficient time for an attacker to attack the challenge and retrieve the verification value.

The fifth stage 405 shows that target device 420 has received and validated the response 460 with the decrypted unlock secret key (USK) at the LAR 422. The target device 420 then sends the USK, along with the blob, to the SPR 424 for further processing. In the sixth stage 406, the target device 420 of some embodiments uses the USK to retrieve (or decrypt) an unlock secret.

In some embodiments, once the security device has been authenticated, the method modifies the accessibility by authorizing a set of restricted operations or providing a higher level of security access at the target device. The seventh stage 407 shows that the target device has been unlocked, based on the unlock record 485. In other embodiments, the target device 420 modifies the accessibility in various other ways, such as unlocking the device, decrypting files at the device, providing elevated security access to the device, etc.

Once the authentication process is complete (successfully or unsuccessfully), the target device 420 of some embodiments updates the registration information (e.g., the blob) associated with the security device 410. For example, in some embodiments, the method modifies a counter that tracks a version for the verification value and generates a new encrypted verification value with the public key of the security device. The seventh stage 407 shows that target device 420 has created a new unlock secret key USK2 and generated a new blob Blob2. In some embodiments, the target device 420 does not create a new unlock secret key for every unlock attempt, but rather creates a new unlock secret key once every n (e.g., 5, 10, etc.) attempts. Generating new unlock secret keys is non-trivial, so generating a new unlock secret key every time can be inefficient. In some such embodiments, a counter is stored in the blob and in an escrow record of the SPR 424 to verify that a response from a security device is newly generated and not a previously used response.

In the eighth stage 408, the particular session with the target device has ended and the target device 420 has been locked again. The new blob Blob2 has been stored in LAR 422 for future authentication requests with the security device 410.

Figure 5:
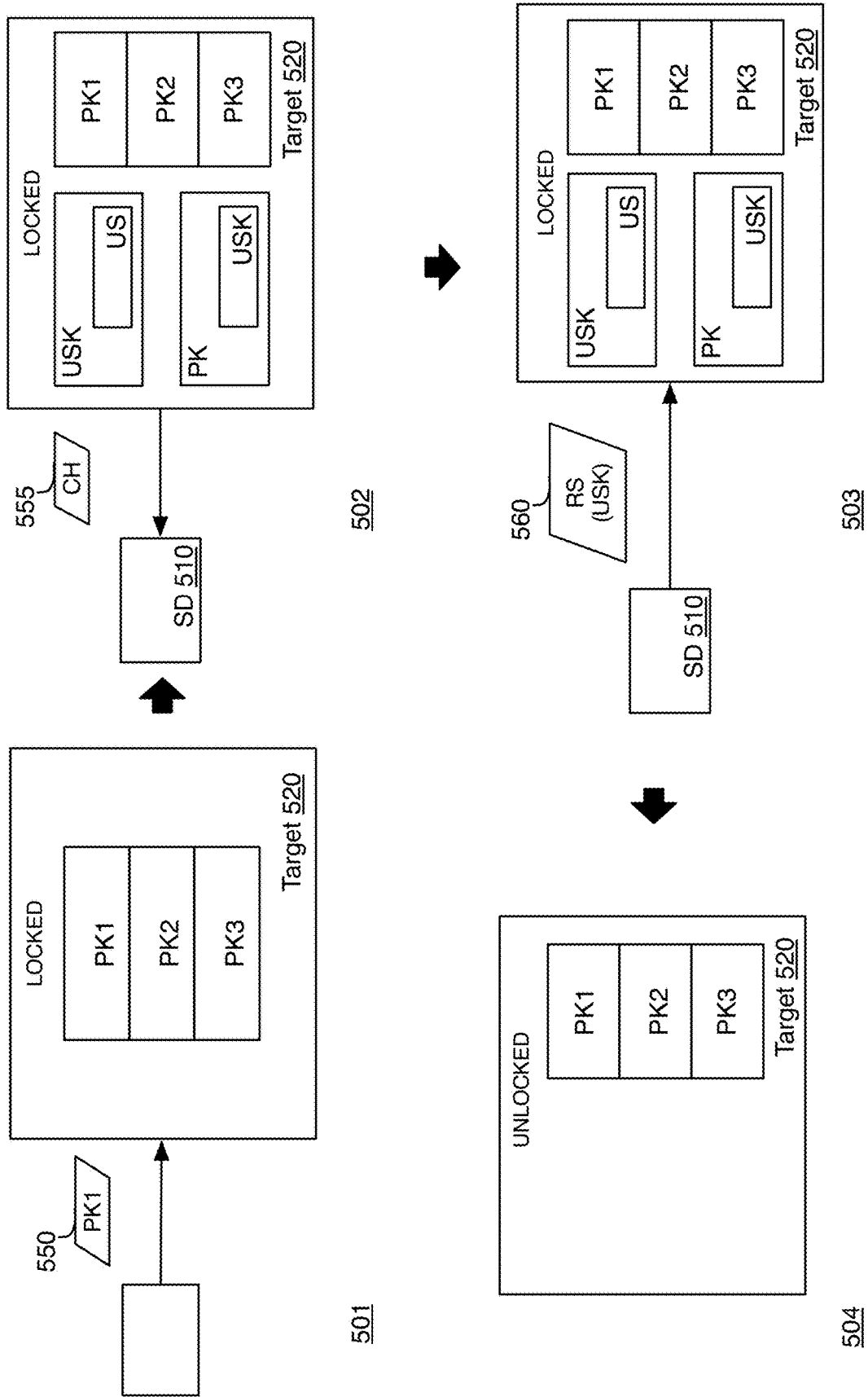
FIG. 5 illustrates an example of a target device that authenticates a security device to modify accessibility to the target device.

As described above, in some embodiments, the target device does not have separate LAR and SPR for authenticating with a security device. FIG. 5 illustrates an example of a target device that authenticates a security device to modify accessibility to the target device. The example of this figure is similar to the example of FIG. 4, but target device 520 in this example does not have a separate SPR.

The first stage 501 shows that the target device 520 receives the public key 550 from the security device 510 when the security device 510 is detected by the target device 520 (e.g., when the security device 510 moves within a particular range of the target device 520, when the security device 510 is inserted into a reader of the target device 520, etc.). The target device 520, upon receiving the public key 550, determines whether the security device 510 is authorized to modify the accessibility of the target device 520. In some embodiments, the target device 520 determines whether a security device 510 is authorized by determining, based on the received public key 550, whether a corresponding record for the security device 510 is stored at the target device 520.

The second stage 502 shows that the target device 520 generates a challenge 555. In some embodiments, the target device 520 generates the challenge 555 by encrypting an unlock secret key (USK) (e.g., a randomly generated value, etc.) using the public key 550. The USK of some embodiments is also used to encrypt an unlock secret, which is stored at the target device 520 and used to unlock the target device 520.

The challenge 555 of some embodiments, like challenge 455 described above, is encrypted such that only the security device 510 is able to decrypt the encrypted value. In some embodiments, the target device 520 generates a new encrypted challenge for each attempt to authenticate the security device so that an attacker cannot use an old version of an encrypted challenge to impersonate the security device 510. The second stage 502 also shows that the target device 520 sends the challenge 555 to the security device 510.

In the third stage 503, the security device 510 has decrypted the challenge 555 and returns a response 560 with the decrypted value to the security device. In the fourth stage 504, the target device uses the decrypted value from the response 560 to decrypt the unlock secret and to unlock the target device 520.

Figure 6:
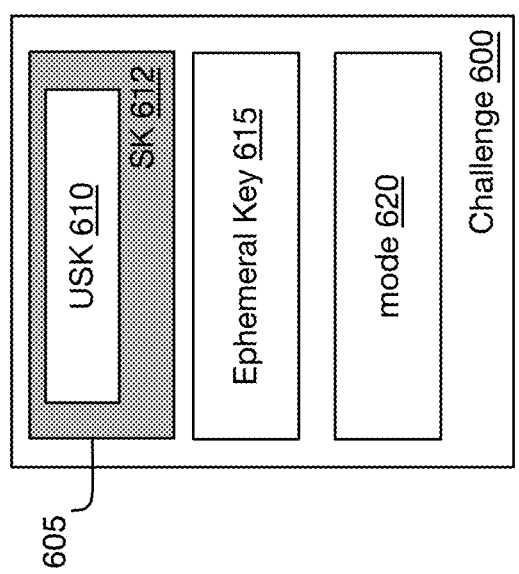
FIG. 6 illustrates an example of a data structure for a challenge issued to a security device.

FIG. 6 illustrates an example of a data structure for a challenge issued to a security device. More specifically, this example shows a challenge 600 with an encrypted user secret key (USK) 605, an optional ephemeral key 615, and a mode 620. The USK 610 of some embodiments is encrypted such that it can only be decrypted using a key 612 that can only be generated by the security device. The USK 610, as described above with reference to FIG. 3, is a key that is used to encrypt an unlock secret in the blob. Once the security device decrypts the USK and returns it to the target device, the target device can use the USK, along with the encrypted unlock secret of the blob, to unlock the target device.

In some embodiments, challenge 600 optionally includes an ephemeral public key 615 when the security device uses a shared key encryption method (e.g., ECDH). The challenge 600 of some embodiments also includes other information that can be used by the security device to process the challenge 600. In this example, the challenge includes a mode 620, which indicates the mode used to encrypt the encrypted user secret 610.

Figure 7:
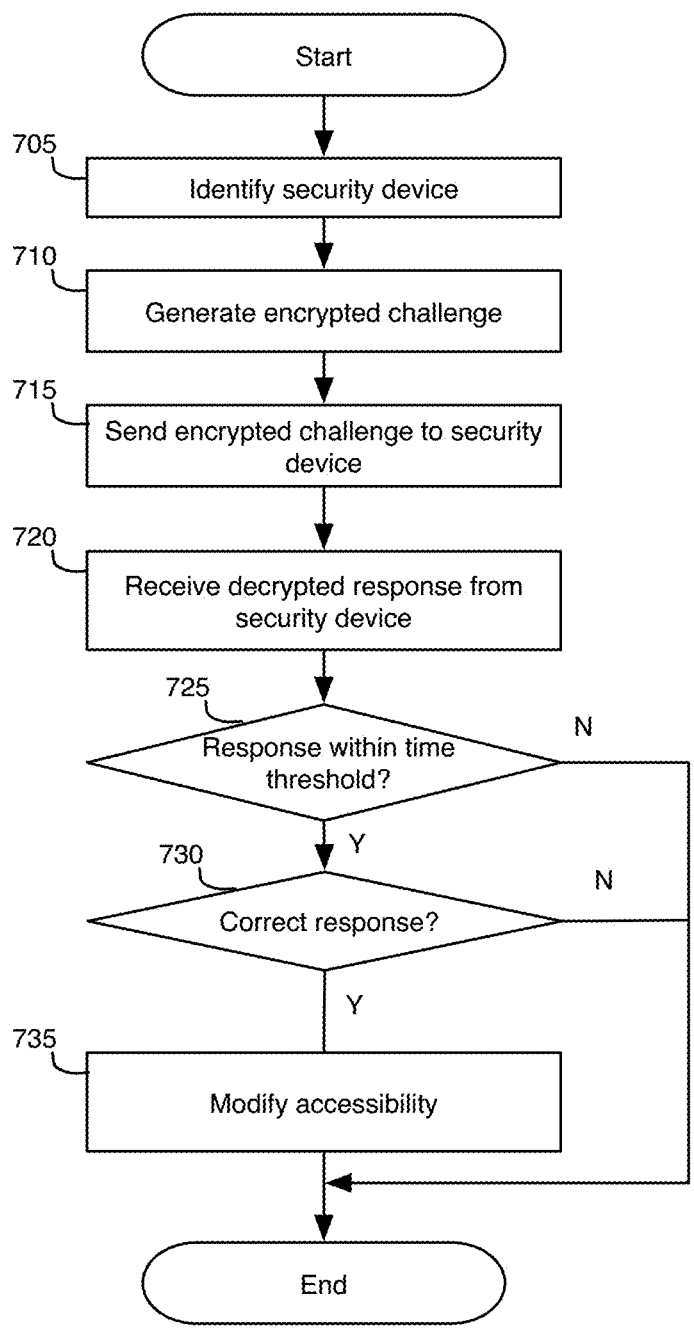
FIG. 7 conceptually illustrates a process for authenticating a security device to unlock a target device.

FIG. 7 conceptually illustrates a process for authenticating a security device to unlock a target device. The process 700 begins by identifying (at 705) the security device. The process 700 of some embodiments identifies the security device when the security device becomes available to the target device (e.g., when a smart card is inserted into a card reader of the target device, or, for wireless security devices, when the security device is detected within a certain proximity of the target device).

The process 700 generates (at 710) an encrypted challenge to authenticate the identified security device. The process 700 of some embodiments generates (at 710) the encrypted challenge based on a public key received from the security device, or a shared key that is shared with the target device. In some embodiments, the process 700 uses a previously generated encrypted challenge that was generated when the security device was created or after a previous attempt to authenticate the security device.

The process 700 then sends (at 715) the encrypted challenge to the security device, which processes the encrypted challenge to generate a response. The process 700 receives (at 720) the decrypted response and validates the response. The process 700 determines (at 725) whether the received response is received within a particular time threshold. In some embodiments, the process 700 sets the particular time threshold to ensure that a response is received in a timely manner.

When the process 700 determines (at 725) that the response is not received within the particular time threshold, the process 700 ends. When the process 700 determines (at 725) that the response is received within the particular time threshold, the process 700 determines (at 730) whether the received response is a correct response that is expected by the target device. For example, in some embodiments, process 700 determines (at 730) that the response is correct by determining whether a decrypted value in the response matches an expected value, which was encrypted as a part of the challenge. In other embodiments, process 700 determines (at 730) that the response is correct by using the decrypted value as a key to attempt to decrypt other encrypted values. If the decrypted value is incorrect, the process 700 will be unable to decrypt and will determine that the response is incorrect.

When the process 700 determines (at 730) that the response is incorrect, the process 700 ends. In some embodiments, the escrow record and the blob for the security device are removed from the target device. When the process 700 determines (at 730) that the response is a correct response, the process 700 of some embodiments modifies the accessibility (or security state) of the target device. The process 700 then ends.

IV. Electronic System

Many of the above-described features and applications are implemented as software processes that are specified as a set of instructions recorded on a computer readable storage medium (also referred to as a computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 8:
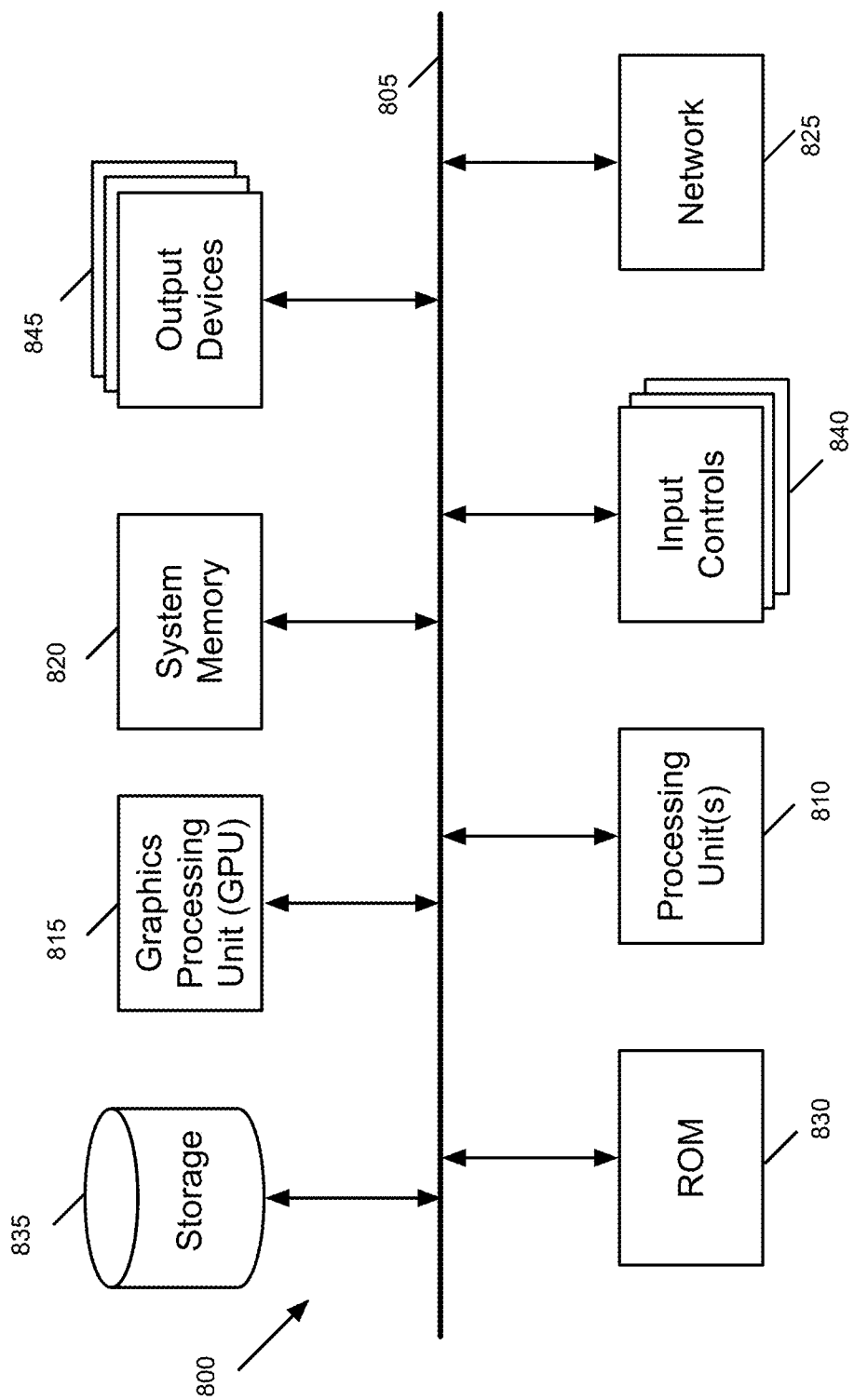
FIG. 8 conceptually illustrates an example of an electronic system with which some embodiments of the invention are implemented.

FIG. 8 conceptually illustrates an example of an electronic system 800 with which some embodiments of the invention are implemented. The electronic system 800 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 800 includes a bus 805, processing unit(s) 810, a graphics processing unit (GPU) 815, a system memory 820, a network 825, a read-only memory 830, a permanent storage device 835, input devices 840, and output devices 845.

The bus 805 collectively represents all system, peripheral, and chipset buses that communicatively connect the numerous internal devices of the electronic system 800. For instance, the bus 805 communicatively connects the processing unit(s) 810 with the read-only memory 830, the GPU 815, the system memory 820, and the permanent storage device 835.

From these various memory units, the processing unit(s) 810 retrieves instructions to execute and data to process in order to execute the processes of the invention. The processing unit(s) may be a single processor or a multi-core processor in different embodiments. Some instructions are passed to and executed by the GPU 815. The GPU 815 can offload various computations or complement the image processing provided by the processing unit(s) 810. In some embodiments, such functionality can be provided using CoreImage's kernel shading language.

The read-only-memory (ROM) 830 stores static data and instructions that are needed by the processing unit(s) 810 and other modules of the electronic system. The permanent storage device 835, on the other hand, is a read-and-write memory device. This device is a non-volatile memory unit that stores instructions and data even when the electronic system 800 is off. Some embodiments of the invention use a mass-storage device (such as a magnetic or optical disk and its corresponding disk drive, integrated flash memory) as the permanent storage device 835.

Other embodiments use a removable storage device (such as a floppy disk, flash memory device, etc., and its corresponding drive) as the permanent storage device. Like the permanent storage device 835, the system memory 820 is a read-and-write memory device. However, unlike storage device 835, the system memory 820 is a volatile read-and-write memory, such a random access memory. The system memory 820 stores some of the instructions and data that the processor needs at runtime. In some embodiments, the invention's processes are stored in the system memory 820, the permanent storage device 835, and/or the read-only memory 830. For example, the various memory units include instructions for processing multimedia clips in accordance with some embodiments. From these various memory units, the processing unit(s) 810 retrieves instructions to execute and data to process in order to execute the processes of some embodiments.

The bus 805 also connects to the input and output devices 840 and 845. The input devices 840 enable the user to communicate information and select commands to the electronic system. The input devices 840 include alphanumeric keyboards and pointing devices (also called "cursor control devices"), cameras (e.g., webcams), microphones or similar devices for receiving voice commands, etc. The output devices 845 display images generated by the electronic system or otherwise output data. The output devices 845 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 8, bus 805 also couples electronic system 800 to a network 825 through a network adapter (not shown). In this manner, the computer can be a part of a network of computers (such as a local area network ("LAN"), a wide area network ("WAN"), or an Intranet), or a network of networks, such as the Internet. Any or all components of electronic system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, a number of the figures (including FIG. 7) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A non-transitory machine readable medium storing a program which when executed by a set of processing units of a particular device, causes the particular device to perform operations, the program comprising sets of instructions for:

registering a security device with the particular device, the registering comprising:
    storing, using a first subset of the set of processing units, an encrypted set of data and an encrypted version of a first key in a first storage of the particular device, the encrypted set of data being encrypted with the first key and the encrypted version of the first key being encrypted with a second key that is stored in a secure storage of the particular device, wherein the secure storage is accessible to a second subset of the set of processing units and the secure storage is inaccessible to the first subset of the set of processing units;
establishing, by the particular device, a connection with the security device, the security device being within a proximity of the particular device;
providing the set of encrypted data and the encrypted version of the first key to the second subset of the set of processing units;
performing, by the second subset of the set of processing units:
    decrypting the encrypted version of the first key using the second key stored in the secure storage;
    decrypting the encrypted set of data using the first key; and
    generating a challenge based at least in part on the decrypted set of data;
sending the challenge to the security device;
receiving a response to the challenge from the security device; and
modifying accessibility for the particular device when the response is determined to be a valid response, the modifying accessibility comprising at least one of: decrypting one or more encrypted files stored in the first storage of the particular device or changing a security state of the particular device.

2. The non-transitory machine readable medium of claim 1, wherein the security device does not have a volatile storage for storing volatile parameters for the particular device to use to provide the response to the challenge, the security device has a private secret for generating the response, and the security device is a device that is provided with a guarantee that the private secret of the security device cannot be accessed by a device external to the security device.

3. The non-transitory machine readable medium of claim 1, wherein the set of instructions for establishing the connection with the security device comprises a set of instructions for receiving a public value from the security device, and
the set of instructions for sending the challenge comprises a set of instructions for generating the challenge based on the received public value of the security device.

4. The non-transitory machine readable medium of claim 1, wherein the registering further comprises:
receiving a public value of the security device, the public value corresponding to a private secret at the security device;
generating an encrypted verification value to be used to authenticate the security device, wherein the encrypted verification value is encrypted with the public value; and
storing the encrypted verification value such that the encrypted verification value is associated with the public value of the security device.

5. The non-transitory machine readable medium of claim 4, wherein the set of instructions for establishing the connection with the security device comprises a set of instructions for receiving the public value from the security device, and
the set of instructions for sending the challenge comprises a set of instructions for sending the stored encrypted verification value associated with the public value of the security device as a part of the challenge to the security device.

6. The non-transitory machine readable medium of claim 4; wherein the encrypted set of data further comprises an encrypted version of an unlock secret used to modify the accessibility of the particular device, wherein the verification value is a key that is used to encrypt and decrypt the unlock secret.

7. The non-transitory machine readable medium of claim 4, wherein the program further comprises a set of instructions for storing an unencrypted set of data related to the security device in the first storage, wherein the unencrypted set of data comprises at least one of the public value for the security device, a counter associated with the encrypted verification value, and a mode identifier that identifies an encryption protocol used by the security device.

8. The non-transitory machine readable medium of claim 1, wherein the challenge is a first challenge based on a counter associated with the security device, wherein the program further comprises a set of instructions for, after modifying the accessibility for the particular device, modifying the counter such that a second challenge provided to the security device comprises a different verification value.

9. The non-transitory machine readable medium of claim 1, wherein the challenge comprises an encrypted verification value that is decrypted by the security device using one of an elliptic curve Diffie-Hellman (ECDH) protocol and a RSA protocol.

10. The non-transitory machine readable medium of claim 1, wherein:
the security device has a private key and a public key,
the challenge comprises a particular value that the particular device encrypts using the public key, and
the response comprises the particular value which the security device decrypts using the private key.

11. The non-transitory machine readable medium of claim 10, wherein the program determines that the response is a valid response by determining whether the decrypted particular value matches the particular value that was encrypted using the public key of the security device, wherein when the particular values do not match, the response is determined to not be valid.

12. The non-transitory machine readable medium of claim 1, wherein the program determines that the response is a valid response by determining whether a period of time greater than a threshold period of time has passed since the challenge was sent to the security device, wherein when the period of time is greater than the threshold period of time, the response is determined to not be valid.

13. The non-transitory machine readable medium of claim 1, wherein the program further comprises a set of instructions for, when the response is invalid, unregistering the security device.

14. The non-transitory machine readable medium of claim 1, wherein the modifying accessibility comprises unlocking the particular device.

15. The non-transitory machine readable medium of claim 1, wherein the modifying accessibility comprises decrypting the one or more encrypted files stored in the first storage of the particular device.

16. A method comprising:
registering, by a device, a security device, the registering comprising:
storing, using a set of processing units of the device, an encrypted set of data and an encrypted version of a first key in a first storage of the device, the encrypted set of data being encrypted with the first key and the encrypted version of the first key being encrypted with a second key that is stored in a secure storage of the device, wherein the secure storage is accessible to a set of secure processing units of the device and the secure storage is inaccessible to the set of processing units;
establishing, by the device, a connection with the security device, the security device being within a proximity of the device;
providing the set of encrypted data and the encrypted version of the first key to the set of secure processing units;
decrypting, by the set of secure processing units, the encrypted version of the first key using the second key stored in the secure storage;
decrypting, by the set of secure processing units, the encrypted set of data using the first key; and
generating, by the set of secure processing units, a challenge based at least in part on the decrypted set of data;
sending the challenge to the security device;
receiving a response to the challenge from the security device;
authenticating the security device when the response to the challenge is determined to be valid; and responsive to authenticating the security device, modifying accessibility for the device, the modifying accessibility comprising at least one of: decrypting one or more encrypted files stored in the first storage of the device or changing a security state of the device.

17. A device comprising:
a memory configured to store one or more encrypted files;
a secure memory;
at least one secure processor;
at least one processor configured to:
   register a security device by:
      storing an encrypted set of data and an encrypted version of a first key in the memory, the encrypted set of data being encrypted with the first key and the encrypted version of the first key being encrypted with a second key that is stored in the secure memory, wherein the secure memory is accessible to the at least one secure processor the secure memory is inaccessible to the at least one processor;
   establish, by a device, a connection with the security device;
   provide the set of encrypted data and the encrypted version of the first key to the at least one secure processor to generate a challenge;
   send the challenge to the security device;
   receive a response to the challenge from the security device;
   authenticate the security device when the response is determined to be valid; and
   responsive to authentication of the security device, perform at least one of: decrypting the one or more encrypted files stored in the memory of the device, or changing a security state of the device; and
wherein the at least one secure processor is configured to:
   receive the set of encrypted data and the encrypted version of the first key;
   decrypt the encrypted version of the first key using the second key stored in the secure memory;
   decrypt the encrypted set of data using the first key; and
   generate the challenge based at least in part on the decrypted set of data.

18. The method of claim 16, wherein the registering further comprises:
   receiving a public key of the security device, the public key corresponding to a private key at the security device;
   generating an encrypted verification value to be used to authenticate the security device, wherein the encrypted verification value is encrypted with the public key; and
   storing the encrypted verification value in association with the public key of the security device.

19. The method of claim 18, wherein the challenge comprises the encrypted verification value.

20. The method of claim 18, wherein the encrypted set of data further comprises an encrypted version of an unlock secret used for modifying accessibility of the device, wherein the verification value comprises a key that is used to encrypt and decrypt the unlock secret.

21. The device of claim 17, wherein the at least one processor is further configured to:
   receive a public key of the security device, the public key corresponding to a private key at the security device;
   generate an encrypted verification value to be used to authenticate the security device, wherein the encrypted verification value is encrypted with the public key; and
   store the encrypted verification value in association with the public key of the security device.

22. The device of claim 21, wherein the challenge comprises the encrypted verification value.

* * * * *